This invention relates to a process for casting polylactams to produce hollow articles, the walls of which are of high tensile strength, tough and of substantially uniform composition.

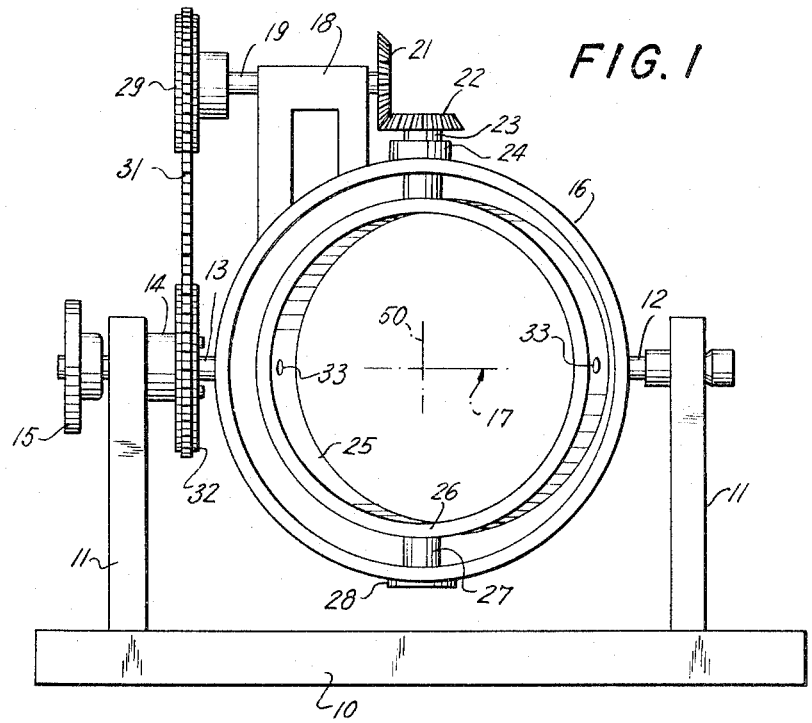
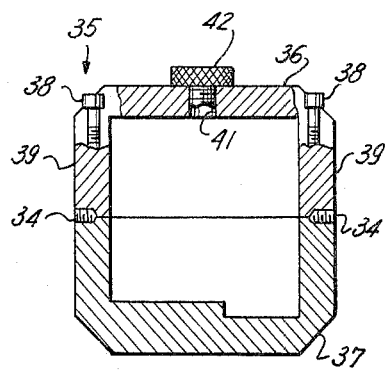
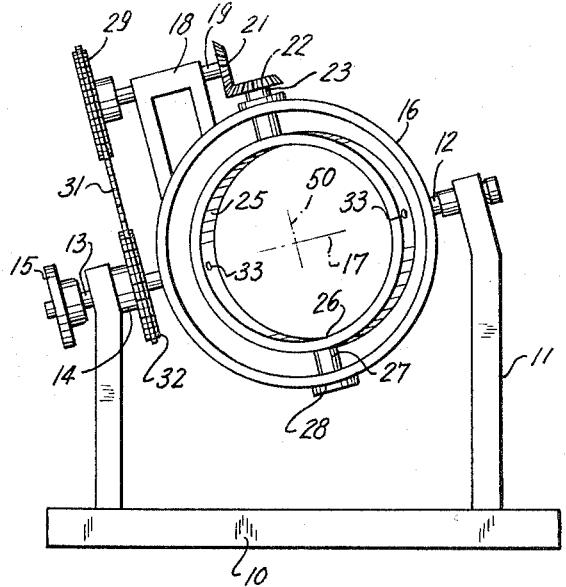
FIG. 1
FIG. 2
FIG. 3
INVENTORS
ELMER C. SCHULE
HERBERT J. PIKE, JR.
BY Benjamin Swedler
ATTORNEY 3,275,733
PROCESS FOR THE PRODUCTION OF HOLLOW ARTICLES OF POLYMERIZED LACTAMS
Elmer C. Schule, Parsippany-Troy Hills, and Herbert J. Pike, Jr., Basking Ridge, N.J., assignors to Allied Chemical Corporation, New York, N.Y., a corporation of New York
Filed Jan. 2, 1963, Ser. No. 248,996
4 Claims. (Cl. 264—310)

Molding of polyamides to produce hollow articles has generally been effected by procedures involving heating the previously prepared polymers to temperatures above their melting temperatures to form fluid melts, introducing the melts into molds and then cooling to solidify the melts. A singular disadvantage of such melt-molding procedures, particularly in the production of shaped polylactam articles, is the necessity of heating the polymer mass to be molded to temperatures in excess of its melting point, e.g., to about 240° C.–265° C. for polyepsiloncaprolactam which melts at temperatures of from about 215° C. to 225° C. in order to produce a fluid melt suitable for casting. It is well known that at temperatures in excess of its melting point, polyepsiloncaprolactam partially depolymerizes, produces an equilibrium mixture comprising the polymeric, monomeric and oligomeric units. The degree of depolymerization becomes more pronounced at increasingly elevated temperatures; hence molded or cast articles prepared by prior known melt-molding procedures frequently contain about 10% by weight of low molecular weight units which are detrimental to the physical properties of the fabricated articles.

After distributing the polymer melt over the interior walls of the mold, it is necessary in the heretofore known melt-molding procedures to cool the polymeric mass contained in the mold to a temperature at which permanent rigidity is obtained. Since the thickness of the mold walls affects the rate of cooling of its contents, molds of intricate shape which possess walls of variable thicknesses frequently undergo non-uniform dissipation of heat during the cooling step. The thicker portions of the mold walls are less effective for the dissipation of heat than are the thinner portions and, as a result, solidification of the polymer is retarded in those areas where the mold walls are thickest.

Attempts to produce hollow articles by casting lactam monomers in a mold employing heretofore known lactam monomer compositions, with or without catalysts, result in unsatisfactory articles because the polymerization proceeds at rather slow rates with uneven polymerization throughout the wall thickness. To the best of our knowledge and belief, it has not been possible with heretofore known epsiloncaprolactam or other lactam compositions to produce tough, high tensile strength, high molecular weight polylactam castings, the walls of which are uniform in thickness. By high molecular weight, as used herein, is meant polylactams having a molecular weight in excess of 100,000 corresponding to m-cresol reduced viscosity, at 25° C. and 0.15 gm./100 ml. concentration of about 3.5.

It is among the objects of the present invention to provide a relatively simple and efficient process for the production of hollow polylactam articles having walls which are tough, of high tensile strength and of uniform thickness, if desired, or certain walls of one thickness and other walls or portions thereof of the hollow articles of a different thickness, with a uniformity in the respective wall thicknesses or portions thereof in the respective articles produced by the process of this invention.

A further object of this invention is to provide such process for producing polylactam articles which are substantially free of low molecular weight degradation products.

Other objects and advantages of the present invention will be apparent from the following detailed description thereof.

In accordance with the present invention, a polymerization charge containing (1) a metal salt of a lactam having the formula:

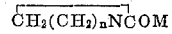
$$\overline{CH_2(CH_2)_nNCOM}$$

in which $n$ is an integer from 2 to 12, preferably 2 to 6, and M is an equivalent weight proportion of an alkali metal or alkaline earth metal including magnesium (i.e., one atomic proportion of an alkali metal or ½ atomic proportion of an alkaline earth metal); (2) a lactam; and (3) a catalyst promoter hereinafter identified is introduced into a heated mold cavity to produce within the mold cavity, at its base, a puddle of the polymerization mixture in the liquid phase in amount just sufficient to produce the desired hollow article of desired wall thickness; the mold cavity rotated about a pair of axes angularly disposed with respect to each other at angular velocities at which the resulting centrifugal forces are below the force of gravity so that the puddle remains in the lower portion of the mold cavity, while heating the mold cavity to a temperature within the range of 130° C. to 215° C. to repeatedly wash the walls of the mold cavity with the polymerization charge as the walls pass under the puddle thereof to build up successive layers of the lactam polymer on the walls of the mold cavity; continuing the heating and rotation until all of the polymerization charge forming the puddle has been used up and a cast article is thus produced of polylactam polymer conforming to the shape of the walls of the mold cavity; and removing the cast article from the mold.

The mold into which the polymerization mixture is introduced is a heated mold, desirably at a temperature within the range of 140° C. to 200° C. The polymerization charge is introduced or formed in the mold cavity at a temperature within the range of 75° C. to 170° C., at a temperature below the temperature of the heated mold. Polymerization is carried out by heating the charge in the mold cavity to a temperature within the range of 130° C. to 215° C. under substantially anhydrous conditions while rotating the mold at angular velocities at which the resulting centrifugal forces are below the force of gravity about a pair of axes angularly disposed with respect to each other so that each area of the internal surface of the mold carries away a thin coating of the prepolymer on each pass under the puddle of polymerization mixture which remains in the base of the mold cavity and diminishes in size as the polymerization proceeds to build up the wall thickness of high molecular weight polymer to the desired extent.

All parts of the mold cavity, i.e., the internal walls of the mold, must be thoroughly coated with the polymerization mixture. As the layers are thus applied, polymer formation takes place on the walls as well as some polymer formation within the puddle of polymerization mixture, which polymer remains dissolved in the monomer as long as sufficient monomer is present. For hollow articles having walls of uniform thickness all parts of the mold surface are evenly coated. This is accomplished by rotating the mold about both of the aforesaid axes at the same angular velocities, so that all internal surfaces are passed under the puddle of polymerization mixture at the same rate. When reinforcement of certain wall areas is desired, this is accomplished by changing the velocities of rotation about the respective axes so that the areas to be thickened are brought in contact with the puddle of polymerization mixture more often than the remaining areas and thus obtain the desired build up.

The puddle remains fluid as long as it contains prepolymer material or polymer dissolved in molten monomer. Since the proportion of monomer available to act as solvent for the polymer decreases at an accelerated rate as more monomer is converted to polymer, by introducing the above enumerated constituents of the polymerization mixture at a lower temperature than the mold temperature and preferably at a temperature when introduced in the liquid phase as close to the melting point of the constituent thus introduced as possible, the puddle tends to remain in a fluid state for the necessary time period to coat the internal walls of the mold to form the hollow articles of desired wall thickness with polymerization occurring uniformly throughout the entire charge as applied to form the walls of the hollow article. Premature gelling of a portion of the charge to form a lump, or wall of undesired uneven thickness, is prevented by operating as hereinabove described with introduction of the polymerization constituents at the disclosed temperatures into a hot mold at a temperature within the range of 140° C. to 200° C.

The lactam employed is a lactam of the formula:

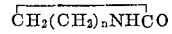

where $n$ is an integer from 2 to 12, preferably 4 to 10. The preferred lactams include epsiloncaprolactam, enantholactam, omegacaprylolactam, omegalaurolactam, mixtures thereof, and mixture thereof with a minor proportion of dilactam such as isopropylidene di-epsiloncaprolactam. Epsiloncaprolactam is preferred for reasons of economy and ready availability of this lactam. The disclosure which follows will describe the invention, for purposes of exemplification, by reference to use therein of epsiloncaprolactam. It will be understood, however, that the disclosed conditions can be employed in polymerizing and casting the other lactams and the invention includes such casting procedures, employing such other lactams in place of the epsiloncaprolactam.

The metal salt of the lactam can be produced by reacting the alkali or alkaline earth metal with the lactam. Preferred metals are lithium, sodium, potassium, rubidium, cesium, calcium and magnesium, as such, or in the form of metal compounds in which the metal M is the cation form combined with Y as the compound MY, in which Y is an anion, particularly hydride, hydroxide, carbonate, amide, oxide, anion of a weak acid, e.g., as shown in Chemical Abstracts, volume 52 of 1958 at column 12529 e, and carbanion derived by removal of a proton from such hydrocarbon species as alkanes, cyclo-alkanes, arylalkanes and benzenoids. Particular illustrative examples of the carbanions are:

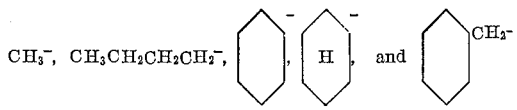

Particularly preferred is lithium caproylimide. It can be prepared, for example, as follows:

Under a blanket of dry, oxygen-free nitrogen 0.7 mol of lithium hydride was added to 10 mols of distilled, dry caprolactam at 90° C. to 110° C./750 mm. and the pressure was reduced to below 10 mm. Use of higher temperatures or use of much more than 10 molecular proportions of lithium hydride per 100 of caprolactam results in solidification of the reaction mixture and partial polymerization of the lactam, as also does the use of atmospheric rather than reduced pressures. A 2-litre resin flask was equipped with appropriate fittings and immersed in a heated oil bath. To ensure a uniform dispersion and reaction of the LiH, a magnetic stirrer was used, which avoided air leaks during the low pressure operations.

A vigorous reaction occurred and after 1 to 2 hours the evolution of hydrogen had virtually ceased. A further reduction in pressure and a slight increase in temperature (110° C.–120° C./1.0–0.1 mm.) allowed caprolactam to be distilled. Distillation proceeded until the still residue contained 20 to 70 atomic proportions of lithium per 100 molecular proportions of caprolactam present (free and as lithium salt). (Concentrations in these units of atomic proportions of lithium are sometimes designated for brevity hereinafter as mols of lithium per 100 mols caprolactam, or mol percent lithium salt concentrate in caprolactam.)

The concentrate was then cooled to room temperature and in a dry atmosphere (nitrogen) was ground to a free-flowing powder. The powdered concentrate was placed in a distillation vessel under dry nitrogen and heated at 100° C.–120° C./1.0–0.1 mm. for a period of 3 to 5 hours to remove caprolactam. The white solid that was obtained melted with decomposition at 320° C.–345° C., and was found by infra-red and elemental analysis to be the lithium salt of epsilon-caprolactam. This salt was hygroscopic but stable in air, in absence of moisture and carbon dioxide, and was completely soluble in water. It has the formula:

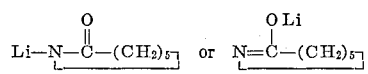

The catalyst promoter is a lactam having on the imide group a heterocyclic substituent in which substituent at least one ring atom is a nitrogen atom doubly bonded to a ring carbon atom, said ring carbon atom being tautomerically linked to the imido group of the lactam. The heterocyclic substituent can be a 5-, 6-, or 7-membered ring containing at least one and not more than three hetero atoms selected from nitrogen, oxygen and sulfur, of which hetero atoms at least one is a nitrogen atom and not more than one is either an oxygen or a sulfur atom.

The lactam moiety of the promoter preferably is saturated and has at least seven ring members, all ring members other than the imido groups being methylene groups; such as, for example, the residue after removal of the imide hydrogen from epsiloncaprolactam, omega-enantholactam, omega-caprylolactam, omega-laurolactam, a dilactam such as isopropylidene dicaprolactam, etc., especially epsiloncaprolactam.

The heterocyclic substituent attached in the promoter to the imido group of the lactam moiety can be saturated, unsaturated, or aromatic and can contain one or more further hetero atoms in the ring in addition to nitrogen therein. As noted, at least one nitrogen atom in this heterocyclic substituent is doubly bonded to a ring carbon atom, and this ring carbon atom is tautomerically linked to the imido group of the lactam moiety. The term "tautomerically linked" has reference to the so-called "tautomeric effect"—see for example Hammett's Physical Organic Chemistry (McGraw-Hill, 1940), page 195; by this term is meant that the carbon atom, doubly bonded to nitrogen in the heterocyclic ring, is attached directly to the imido group of the lactam, or is attached thereto by a chain of alternating singly and doubly bonded atoms in the heterocyclic ring, the chain consisting of an even number of such atoms, whereby the said carbon doubly bonded to ring nitrogen is conjugated with the imido group.

The heterocyclic ring can have a wide variety of substituents—even including substituents replaceable by the lactam anion of the lactam-metal salt serving as catalyst in the polymerization and substituents containing active hydrogen—provided sufficient metallic catalyst is used in the polymerization to provide adequate catalyst after any reaction of the catalyst with substituents in the promoter. These substituents can be halo, alkoxy, and other replaceable substituents; alkyl, aryl, alkaryl, arylalkyl and other hydrocarbonyl substituents; and hydroxyalkyl, amino, aminoalkyl, etc. to the extent these do not eliminate the active catalyst. Amino groups tend to act as terminators in the polymerization. Since the promoters become the starting point of the molecular chains in the resulting polymers, the substituents in the promoters can be chosen for the particular effects, e.g., dyeing or stabilizing against again, which they impart to the polymer product.

A simple compound illustrative of the promoters is N-(2-pyridyl)-epsiloncaprolactam which can be represented as a resonance hybrid of the following formulae (and others):

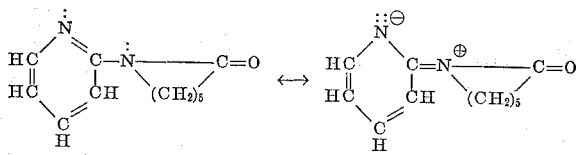

In this compound the lactam moiety is epsiloncaprolactam, and the heterocyclic substituent is the 2-pyridyl radical. It will be observed that this pyridyl ring in the first formula contains one nitrogen atom doubly bonded to a ring carbon atom, and in the specified 2-pyridyl compound the carbon doubly bonded to nitrogen, i.e., the 2-carbon, is directly linked to the imido nitrogen of the lactam. It will be further observed that this 2-carbon is doubly bonded to the ring nitrogen of pyridine only in one of the two indicated tautomeric structures as contributing to the resonance hybrid representing pyridine. Such tautomeric double bonds are included within the aforesaid definition of the catalyst promoters.

A second example of the promoters is N-(4-pyridyl)-epsiloncaprolactam wherein the 2-carbon of the 4-pyridyl ring is again doubly bonded (in some of the tautomeric structures) to the ring nitrogen. This doubly bonded 2-carbon atom is conjugated with the imido nitrogen of the lactam by the single bond from 2-carbon to 3-carbon, and the double bond from 3-carbon to 4-carbon, 4-carbon being attached by a single bond to the imido nitrogen. Thus in the 4-pyridyl ring, the 2-carbon is tautomerically linked to the nitrogen atom of the imido group, in the sense this term is used herein. Representative tautomeric structures involved are shown in the following formulae:

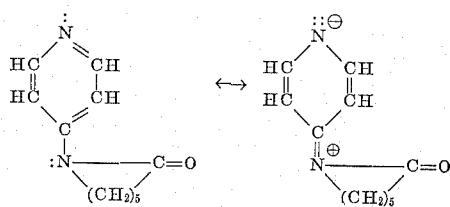

The aforesaid promoters can be prepared and isolated as pure compounds, or can be prepared in the parent lactam, e.g., as concentrates therein, or can be produced in situ in the polymerization reaction mixture during polymerization. In general, they are prepared by reaction between the parent lactam and the heterocyclic compound bearing a substituent reactive with imide hydrogen and/or with a metal salt of the lactam such as the lithium salt; this reactive or replaceable substituent being on at least one carbon atom doubly bonded to nitrogen, or on a carbon atom connected to said carbon by a conjugating chain as above defined. Examples of suitable substituents are chloro, bromo, iodo, alkoxy, aryloxy, arylalkoxy, hydroxy, alkylamino, dialkylamino, anilino, alkylthio, arylthio, arylalkylthio, alkarylthio and mercapto.

The parent lactams which have been found best suited for production of the aforesaid promoters are the saturated, unsubstituted lactams having one imide group in the ring and 7–13 ring members.

Among suitable parent heterocyclic compounds, the more important comprise a 5-, 6-, or 7-membered ring (fused or not) containing at least one and not more than three hetero atoms selected from nitrogen, oxygen and sulfur, of which hetero atoms at least one is a nitrogen atom and not more than one is either an oxygen atom or a sulfur atom. Examples of such heterocyclic compounds are:

(1) The symmetrical triazines such as 2,4,6-trichloro-s-triazine, 2,4,6-tribromo-s-triazine, 2,4-diiodo-6-chloro-s-triazine, 2,4 - difluoro - 6 - chloro - s - triazine, 2,4,6-trihydroxy - s - triazine (cyanuric acid), 2,4 - dichloro - 6-hexoxy-s-triazine, 2,4-dimethoxy-6-chloro-s-triazine, 2,4-diphenoxy-6-chloro-s-triazine, 2,4-dicyclohexyl-6-bromo-s-triazine, 2 - benzyl - 4,6 - dichloro - s - triazine, 2,4,6-tri(methylamino) - s - triazine, 2-chloro-4,6-di(diisopropylamino)-s-triazine, 2 - chloro - 4,6-di(benzylamino)-s-triazine, 2-chloro-4,6-di(cyclohexylamino)-s-triazine, metal salts of cyanuric acid, 2-chloro-4,6-di(phenylamino)-s-triazine, 2-bromo-s-triazine, 2-chloro-4,6-di(di-t-butylphenoxy)-s-triazine, 2,4,6-triphenoxy-s-triazine, 2,4,6-trimethoxy-s-triazine, 2,4,6-trihexoxy-s-triazine, 2,4,6-tribenzyloxy-s-triazine, 2,4,6-tri(dimethylamino)-s-triazine, 2,4,6 - tri(diphenylamino) - s - triazine, 2,4,6 - tri(benzylamino)-s-triazine, 2-butyl-4-chloro-6-methoxy-s-triazine, 2-methyl-4-chloro-6-decyloxy-s-triazine, 2-decyl-4-bromo-6-benzylamino-s-triazine, 2,4-dibutyl-6-chloro-s-triazine, 2-hydroxy-4-cyclohexyl-6-chloro-s-triazine, 2,4-diamino-6 - chloro - s - triazine, 2 - trichloromethyl - 4-phenoxy-6-phenyl-s-triazine and 2,4-diphenyl-6-chloro-s-triazine, as well as s-triazines with azo compound substituents.

(2) The pyridazines such as 3,6-dichloropyridazine, 3,6 - dibromopyridazine, 3 - iodo - 6 - chloropyridazine, 3 - chloro - 6 - fluoropyridazine, 3,4,6 - trichloropyridazine, 4,5 - dichloropyridazine, 3 - chloro - 6 - hexoxypyridazine, 3,6 - dimethoxypyridazine, 3,6 - diphenoxypyridazine, 3 - cyclohexyl - 6 - bromopyridazine, 3-benzyl-6 - chloropyridazine, 3,6 - di(methylamino) pyridazine, 3-chloro - 6 - diisopropylaminopyridazine, 3 - chloropyridazine, 3,6 - dihexoxypyridazine, 3,6 - dibenzyloxypyridazine, 3, 6 - dibenzylaminopyridazine, 3 - chloro - 4-butyl - 6 - methoxypyridazine, 3 - chloro - 5 - methyl - 6-decyloxypyridazine, 3 - chloro - 4,5 - dibutylpyridazine, 4,5 - diphenyl - 6 - chloropyridazine, and 3,6 - dihydroxypyridazine.

(3) The cinnolines such as 3-chlorocinnoline, 4-bromocinnoline, 3 - methoxycinnoline, 3 - phenoxycinnoline, 3,4 - dichlorocinnoline, 3 - chloro - 5 - methylcinnoline, 3,4 - diphenoxy - 6 - butylcinnoline and 3-dimethylaminocinnoline.

(4) The phthalazines such as 1-chlorophthalazine, 1,4-dichlorophthalazine, 1,4-dimethoxyphthalazine, 1,4 - diphenoxyphthalazine and 1-bromo-4-methoxy-6,7-diphenylphthalazine.

(5) The pyrimidines such as 2,4,6-trichloropyrimidine, 2,4,6 - trihydroxypyrimidine (barbituric acid), 2,4 - dichloropyrimidine, 2,4 - dibromopyrimidine, 2 - iodo - 6-chloropyrimidine, 2 - chloro - 6 - fluoropyrimidine, 2,4-dihydroxy - 6 - methylpyrimidine, 2,4 - dihydroxypyrimidine, 2 - chloro - 6 - hexoxypyrimidine, 2,4,6 - trimethoxypyrimidine, 2,4,6 - triphenoxypyrimidine, 5 - cyclohexyl - 6 - bromopyrimidine, 2 - benzyl - 6 - chloropyrimidine, 4-cyclohexyl - 6 - bromopyrimidine, 2,4-di(methylamino) pyrimidine, 2 - chloro - 6 - diisopropylaminopyrimidine, 2 - bromopyrimidine, 2,4 - dihexoxypyrimidine, 2,4 - dibenzyloxypyrimidine, 2,4 - dibenzylaminopyrimidine, 2 - chloro - 4 - butyl - 6 - methoxypyrimidine, 2 - chloro - 4 - methyl - 6 - decyloxypyrimidine, 2 - chloro-4,5 - dibutylpyrimidine, 4,5 - diphenyl - 6 - chloropyrimidine, 2 - hydroxypyrimidine, 2,4 - diethoxypyrimidine, 2,4 - dimethoxypyrimidine.

(6) The quinazolines such as 4 - chloroquinazoline, 4-methoxyquinazoline and 2,5-dichloroquinazoline.

(7) The pyrazines such as 2 - chloro- and 2-bromopyrazines, tetrachloropyrazine, and pyrazines derived from these by replacing one or more halogen atoms by methoxy or phenoxy groups.

(8) The 2- and 4-pyridyl compounds, e.g., 2-chloropyridine, 4 - chloropyridine, 2 - phenoxypyridine, 4-phenoxypyridine, 2 - methoxypyridine and 4 - methoxypyridine.

(9) The quinolines such as 2-chloroquinoline and 4-chloroquinoline.

(10) The quinoxalines such as 2,3-diphenoxyquinoxaline.

(11) The oxazoles such as benzoxazoles, e.g., 2-chlorobenzoxazole, 2-phenoxybenzoxazole and 2-methoxybenzoxazole.

(12) The thiazoles such as benzothiazoles, e.g., 2-chlorobenzothiazole, 2-phenoxybenzothiazole and 2-methoxybenzothiazole.

(13) The pyrazoles such as benzopyrazoles, e.g., 2-chlorobenzopyrazole, 2 - phenoxypyrazole, 2 - methoxybenzopyrazole.

(14) The oxazines such as benzooxazines, e.g., 2-chlorobenzooxazine, 2 - phenoxy - benzooxazine, 2-methoxyoxazine.

The promoter can be prepared by heating, e.g., a chloro, phenoxy, or methoxy heterocyclic parent compound with the lactam to be polymerized or with caprolactam, or with a solution or suspension of, e.g., lithium salt of said lactam. The product of metathesis such as hydrogen chloride, methanol, lithium chloride or lithium hydroxide is volatilized or precipitated or removed via formation of, e.g., a lactam hydrochloride. This reaction can be conducted in the lactam as diluent with distillation of the lactam at reduced pressure to concentrate the reaction products and remove any water and/or volatile matathesis products; or can be conducted using a concentrated metal salt, e.g., lithium salt of the lactam in excess lactam or in an inert solvent such as benzene or xylene. The resulting reaction products can be worked up to purify the desired promoter compound, or can be partially purified, or used as obtained from the reaction.

The ratio of atom equivalents of metal in the metal lactam to equivalents of heterocycle-substituted imido groups of the promoter are in the range from about 0.1:1 to about 20:1 or higher. Suitable promoter concentrations are in the range from 0.01-10 equivalents of heterocycle-substituted imido groups per 100 mols of the lactam in the polymerization mixture. To avoid conversion of the metal lactam to inactive compounds, the presence of water and carbon dioxide in the mold cavity or in association with the constituents of the polymerization mixture should be avoided. This can be accomplished, for example, by purging the mold cavity with dry nitrogen or other inert gas and maintaining the metal lactam, heterocyclic compound, promoter when prepared and the lactam under a blanket of dry nitrogen.

Particularly preferred as giving a convenient reaction rate and a cross-linked, solvent-resistant final product are polymerization mixtures consisting of metal lactam, especially lithium caproylimide, a symmetrical triazine which bears on all three of its ring carbon atoms a replaceable subsituent, such as halogen, particularly chloro, alkoxy, aryloxy, arylalkoxy, cycloalkoxy, mono and dialkylamino, mono- and di-arylamino, mono- and di-arylalkylamino, mono- and di-cycloalkylamino and azo compounds, the alkyl groups having from 1 to 20 carbon atoms and the aryl groups are phenyl or napthyl, especially 2,4,6-trichloro-s-triazine or 2,4,6-triphenoxy-s-triazine, 2,4,6-trimethoxy triazine and epsiloncaprolactam.

In accordance with the preferred embodiment, a catalyst containing an alkali metal or an alkaline earth metal, especially lithium, is admixed under anhydrous conditions with epsiloncaprolactam to form a reaction mixture containing from about 0.1 to about 10 gram equivalents of the metal per 100 gram equivalents of lactam. The temperature of the mixture is elevated to about 90° C.–130° C. to effect complete inter-action of the catalyst with an equivalent quantity of the lactam. The reaction mixture thus produced is agitated as a liquid at about 75° C.–170° C., preferably about 80° C.–100° C., and introduced along with the above specified triazine and the balance of the caprolactam also in liquid phase and at like temperatures into the mold cavity, which is heated to a temperature in the range of 140° C.–215° C., and at least about 40° C. higher than the temperature of the charge. The proportion of metal catalyst triazine is such that the ratio of equivalent weights of metal in the reaction mixture to equivalent weight of replaceable substituents in the triazine is within the range of from about 2 to 1 to about 10 to 1. Preferred concentrations of triazine compound in the final reaction mixture based on molecular equivalents of lactam and/or replaceable groups therein are about 0.1–1 equivalent per 100 mols of caprolactam.

Employing triazino compounds having three readily replaceable substituents, such as chloro, methoxy or phenoxy, as preferred, the preferred ratios of atom equivalents of metal to molecular equivalents of replaceable substituents of triazino compounds are from about 6 to 1 to about 30 to 1. The triazine can be admixed with the metal lactam and the resultant mixture introduced into the mold cavity or the metal lactam and triazine separately added to the mold cavity with or without additional lactam. In determining the equivalent weights of lactam the lactam in the metal lactam as well as that employed as the solvent for the triazine compound should be considered as lactam in the polymerization mixture.

Polymerization is conducted within the mold cavity while the latter is rotated about axes at an angle to each other so that the walls of the mold cavity are constantly and uniformly washed with, i.e., passed under, the puddle of polymerization reaction mixture, by heating the mold cavity to a temperature within the range of from 130° C. to 215° C., preferably within the range of from about 140° C. to 180° C. and at least about 40° C. higher than the temperature of the charge introduced as a liquid within the temperature range of 75° C.–170° C., preferably about 80° C.–100° C.

Polymerization is carried out under substantially anhydrous conditions, i.e., the mold cavity preferably is first flushed with an inert gas such as nitrogen, to remove air and moisture content in the air therefrom, and after introducing the polymerization reaction mixture, necessary precautions are taken to exclude compounds such as mineral acids and water, including moisture present in the atmosphere, from the mixture undergoing polymerization. This can be effected in any desirable manner, for example, by sealing the mold cavity after the introduction of the charge by gas-tight seals and/or by carrying out the polymerization under a blanket of nitrogen or other inert gas.

While it is preferred to prepare the metal lactam just prior to feeding it into the mold cavity, the metal lactam, if desired, can be prepared at any convenient time and stored for use. The metal lactam has been found to be stable at temperatures of 20° C.–25° C. for a period of at least one month.

When lithium caproylimide is used in the pure state, it is added to the other reactants either before introduction into the mold cavity, or introduced into the mold cavity as a fine powder because large surface area is desirable to obtain good surface content with the molten lactam. The lithium caproylimide dissolves in the molten lactam; it is not necessary to introduce the lithium caproylimide at a temperature at or above its melting point. Solutions containing from 20% to 70% lithium caproylimide are effective catalysts. Lithium caproylimide dissolves in lactam to produce a homogeneous liquid. When only a small portion of the total lactam is premixed with the lithium caproylimide, say up to about 20%, little polymerization occurs during storage and such premixes can be prepared and stored for relatively long periods of time for use in the molding as required. On the other hand, when larger amounts of lactam are mixed with the lithium caproylimide, e.g., from above 20% up to about 80% of the total lactam, polymerization may occur during storage to a degree which is detrimental when the resultant mixture is introduced into the mold cavity. Accordingly, when the metal catalyst preparations are to be stored they should contain either not over 20% by weight of lactam, or should contain at least 80% by weight of lactam.

The triazine constituent of the catalyst promoter, on the other hand, does not cause polymerization of the lactam when mixed therewith and the mixture stored at room temperature. This is also true of the triazino lactam promoter. These constituents are stable in all proportions with lactam.

The constituents of the polymerization mixture can be premixed for introduction into the mold cavity, or introduced directly into the mold cavity, in any of the following manners:

(1) Separate feeds of (a) metal lactam, (b) triazine compound, and (c) lactam.

(2) Separate feed of (a) metal lactam, (b) triazine compound admixed with a portion only of the lactam, and (c) the rest of the lactam.

(3) Separate feed of (a) metal lactam, and (b) triazine compound with all lactam required for the polymerization.

(4) Separate feed of (a) metal lactam and part of lactam, (b) triazine compound, and (c) rest of lactam (5) Separate feed of (a) metal lactam and part of lactam, (b) triazine compound and part of lactam, and (c) rest of lactam.

(6) Separate feed of (a) metal lactam and part of lactam, and (b) triazine compound and rest of lactam.

In all of the above procedures, the metal lactam can be stored in the solid phase and introduced in the solid phase into the mold cavity or admixed with the other components of the polymerization mixture and the resultant mixture containing the metal lactam partially or completely dissolved in the lactam introduced into the mold cavity. Solid metal lactam dissolves readily in the polymerization mixture at the temperature conditions prevailing in the mold cavity.

Premixtures of any of the above six combinations can be used if desired. Of the above (3) and (6) require the storage and handling on the part of the molder or caster of only two feeds whereas the other procedures require the proportioning of three distinct feeds. Procedure (6) above is preferred, employing a metal lactam and a heterocyclic compound each admixed with roughly half of the total lactam to be charged. Both feeds are stable and can be stored without deleterious polymerization taking place for relatively long periods of time. Their use requires the proportioning of only two feeds.

Various filler materials, such as mineral fillers, including sand, pigments, and, where it is desired to reduce the toughness of the walls, plasticizers, can be incorporated in the polymerization reaction mixture introduced into the mold cavity. During the rotation of the mold cavity, the fillers are dispersed throughout the polymerization reaction mixture and are incorporated in the successive layers produced by the polymerization to produce walls having the fillers uniformly distributed therethroughout. By employing heterocyclic compounds having chromophoric substituents, for example, azo compound substituents, a colored polylactam product is produced in which the dye is part of the molecular structure and hence non-extractable. Antioxidant groups such as 2,6-di-t-p-cresyl can similarly be incorporated as a permanent part of the polymer structure. The presence of aliphatic groups imparts hydrophobicity to the polylactam thus making it less susceptible to deformation and hydrolytic attack.

In the drawing, which shows for purposes of exemplification, different arrangements for rotating mold cavities in which the casting procedure of this invention can be carried out:

FIGURE 1 is a side elevational view showing one form of mechanism for rotating the mold along horizontal and internal axes at right angles to each other;

FIGURE 2 is a vertical section through a typical mold, useful for producing automobile tanks and similar hollow tanks, having the cross-sectional outline shown in this figure; and FIGURE 3 is a fragmentary side elevational view of a modified form of rotational mechanism, in which the axis extending in a generally horizontal direction is inclined of the horizontal, say about 20°.

Referring to FIGURE 1, a supporting plate 10 has thereon a pair of spaced mounting brackets 11 in which shafts 12 and 13 are journalled for rotation. Shaft 13 is journalled in a bearing 14 and is driven by a gear 15 keyed thereto from any suitable source of power, such as an electric motor, not shown. The inner ends of shafts 12 and 13 are fastened or formed integrally with an outer rotatable ring member 16. This member is rotated by the shafts 12 and 13 about the horizontal axis 17.

Mounted for rotation with member 16 is the bearing support 18 in which is journalled for rotation a shaft 19 having a bevel gear 21 keyed thereto. Gear 21 meshes with a gear 22 on shaft 23 journalled for rotation in bearing 24 carried by the outer ring 16. Shaft 23 is affixed to an inner ring 25 which is suitably supported at its diametrically opposite end 26 by a supporting member or shaft 27 affixed to the outer ring 16 at 28.

Shaft 19 is driven by a sprocket 29 keyed thereto over which passes a chain 31 driven by a sprocket 32 mounted on shaft 13 and driven thereby.

Inner ring 25 has at diametrically opposite points bolt receiving openings 33. Bolts pass through these openings 33 into threaded openings 34 in the two-part mold 35, shown in FIGURE 2. This mold is of generally rectangular shape in cross-section and comprises an upper portion 36 and a lower portion 37 held together by removable bolts 38 which are arranged to be received in threaded openings passing through the length of the side walls 39 of the upper portion 36 into complementary threaded openings extending into the upper portion of the lower section 37. Any desired number of such bolts 38 can be used and they are spaced along the length of the side walls so as not to intersect the threaded openings 34.

A filling opening 41 is provided, through which the polymerization charge can be introduced into the mold. A removable and replaceable closure 42 seals this opening during casting and can be removed to permit charging the mold cavity.

When the casting procedure has been completed to produce an article of the shape of the interior of the mold, of desired wall thickness, controlled by the amount of charge introduced into the mold cavity, the mold is removed from the inner ring 25 after the machine is brought to rest, by removing the tie bolts passing through the openings 33 into the openings 34, and the mold is then disassembled by removing the bolts 38. Upper section 36 can then be separated from the lower section 37 to give access to the completed article which can then readily be removed from the mold.

In the modification of FIGURE 3, the axis 17 is at an inclined angle to the horizontal, about 20°. With this construction, random motion of the polymerization mixture is obtained, in which continual "new surface" is exposed to the puddle as orbiting of the mold continues. Such random motion is obtained in both the modification of FIGURE 1, as well as that of FIGURE 3. In the modification of FIGURE 3, however, there is less tendency for exposure of the poles, i.e., the intersections of the internal axis 50 with the cavity surface, to the polymerization mixture, more often, to any appreciable extent, than the remaining surface of the mold cavity.

The molds are made of stainless steel or aluminum. Aluminum has been used successfully and found desirable from the standpoint of temperature uniformity throughout the mold. The internal surface of the mold should be kept clean. Although not usually necessary, a mold release agent such as a film of silicon grease or oil can be provided on the mold cavity surface to facilitate release of the cast article.

Shafts 12 and 13 are rotated at any desired speed, preferably from 6 to 60 revolutions per minute, with the shafts 23 and 27 supporting the inner ring 26 for rotation about the internal axis 50, desirably rotated at a speed from ¼ to ⅛ the speed of rotation of the shafts 12 and 13. For hollow articles having all walls of the same thickness, the shafts 12 and 13 as well as the shafts 23 and 27 are rotated each at a uniform rate below the angular velocities which produce centrifugal forces equal to the force of gravity, desirably at a speed not exceeding the speed of rotation which generates a force greater than ½ the force of gravity. The optimum speeds of rotation will vary with the mold size, configuration of the mold cavity, the activity of prepolymer, and the temperature of the polymerization, and for any given situation can be determined by a few trial experiments.

The prepolymer can be placed in the mold at any desired temperature, but for the reasons above given is placed in the hot mold at a relatively low temperature, when liquid near its melting point. The mold preferably is preheated to a temperature of 140° C. to 200° C. before introducing the prepolymer. After mounting on the inner frame 25, the entire assembly is placed within an oven. The mold preferably is pre-purged with dry nitrogen. The amount of the prepolymer charge will, of course, depend on the size of the mold cavity and the desired wall thickness. When the desired charge of prepolymer is introduced into the mold cavity, the mold is then sealed and rotation started.

The puddle of prepolymer within the mold remains fluid for a finite period of time; the film of prepolymer which wets the mold walls during each revolution, is quickly raised to a temperature where polymerization is rapid and a high molecular weight polymer results. Wall thickness is thus built up, layer by layer, with substantially complete polymerization throughout the wall thickness and no remaining puddle when the desired wall thickness or thicknesses has been obtained. By introducing the charge of prepolymer of the necessary amount to produce the desired wall thickness or thicknesses and maintaining uniform mold temperatures, taking into account the size and configuration of the mold cavity and the time required for the prepolymer to polymerize to produce the desired high molecular weight polymer, and rotating the mold as hereinabove described, walls uniform throughout their thickness or thicknesses and of exceptionally high tensile strength and toughness result.

The following examples are given to further illustrate the invention. It will be understood the invention is not limited to these examples. In the examples, the temperatures are expressed in degrees centigrade.

*Example I*

The mold used was of the shape shown in FIGURE 2 and the rotational mechanism was as illustrated in FIGURE 3 to produce a 4" x 8" x 12" tank. The mold was thoroughly cleaned, dried and assembled by insertion of the bolts 38. The mold was affixed to the inner ring 25 as hereinabove described, and the entire assembly was placed in an oven maintained at a temperature of 155° C. When the mold reached 155° C., the filler cap 42 was removed and the mold was carefully purged with a stream of dry nitrogen.

A liquid preparation of 1.68 mol percent lithium caproylimide in dry epsiloncaprolactam at 100° C. was mixed with a liquid preparation of 0.16 mol percent 2,4,6-triphenoxysym.-triazine in dry epsiloncaprolactam at 100° C. The mixture was charged into the heated mold in quantity (25–30 ounces) to produce a hollow replica with walls about ⅛ inch thick. The mold was sealed by replacing the plug 42; the oven was closed and the mold was rotated about the two axes simultaneously, these operations being completed in less than 15 seconds. The rotation about the external fixed axis 17 was at the rate of 12 r.p.m., and the simultaneous rotation about the internal axis 50 was at 1.5 r.p.m. Rotation was continued for 60 minutes while the mold was maintained at about 160° C. by heating the oven to balance heat losses from the mold. At the end of the 60 minutes, rotation of the mold was terminated, the mold was removed from the oven, and as soon as it reached room temperature was opened. Upon disassembling the mold, the fabricated product was obtained, the walls of which were of uniform thickness of about ⅛ inch throughout except for the outside corners, which were somewhat heavier and gave a strengthening effect to the tank.

*Example II*

This example differs from Example I in that 2,4,6-trichloro-s-triazine was substituted for the 2,4,6-triphenoxy-s-triazine. A molded tank of uniform thickness, the walls of which were tough and of high tensile strength, as in the case of Example I, was thus obtained.

Use of the 2,4,6-trimethoxy-s-triazine instead of 2,4,6-triphenoxy-s-triazine in the procedure of Example I gives similar results to Example I. Each of the compounds hereinabove named can be substituted for 2,4,6-triphenoxy-s-triazine in the procedure of Example I and will give generally similar results.

Hollow-shaped articles of any size or shape can readily be prepared by the casting procedure of this invention. For example, molds can be used for fabricating luggage, boat hulls, jettison type fuel tanks for aircraft, storage tanks, and other articles can be prepared.

The polymerization mixture hereinabove described polymerizes readily and relatively quickly at temperatures of 130° C. to 215° C., preferably 140° C. to 200° C., to produce high molecular weight tough polymers and, surprisingly, does so under the conditions of the process of this invention, involving the washing of the mold walls and the successive layers of polymer formed therefrom to produce polymer walls of desired thickness built up layer by layer. In the examples about 1 hour was required for the liquid prepolymer in the mold cavity to be polymerized to its final high polymer state; many of the polymerization mixtures herein disclosed polymerize in about 10 minutes to produce high molecular weight polymers.

The polymerization proceeds so rapidly that, as the wall cavity is washed with the puddle of prepolymer, which wall cavity is at polymerization temperatures, a film of polymer is formed thereon and successive films are produced until the entire charge has been polymerized to produce a wall of desired thickness. The thickness is controlled by the amount of prepolymer charged and the shape of the mold cavity. This process can be used to produce hollow articles of any desired thickness. Hollow articles having a wall thickness of ⅛ inch have been made with walls of excellent uniformity. Of course, the thicker the walls over and above a certain maximum, depending on the polymer formed and the polymerization conditions, the greater the danger of having the walls non-uniform. Chiefly for this reason, we prefer to use this invention to cast articles having a maximum thickness not exceeding from about ⅜ inch to about ½ inch.

As compared with heretofore known melt-molding procedures, the process of this invention achieves several unique advantages in the production of hollow polylactam articles. By casting such articles below the melting point of the polymer, as in the present invention, the degradation of the polymer is avoided. The walls of the products produced according to the present invention show unusual uniformity; they generally contain less than 5% by weight of monomeric and oligomeric materials.

The hollow articles cast by this invention are obtained without the necessity of resorting to cooling procedures to obtain permanent rigidity. Since the polymerization of lactams is an exothermic reaction, differential heat transfer through varying thickness mold walls does not interfere with the production of articles having such different wall thicknesses.

Polylactam articles can be prepared by the process of this invention, having relatively high molecular weights, e.g., polycaprolactam exhibiting a maximum reduced viscosity in 0.5 weight percent M-cresol of about 15, which represents an average molecular weight of the order of 500,000. Such articles possess greater tensile strength and toughness than have been obtainable by heretofore known procedures of polymerizing or casting polylactams.

Since certain changes can be made in the casting procedure hereinabove disclosed, without departing from the scope of this invention, it is intended that all matter contained in the above description or shown in the accompanying drawing shall be interpreted as illustrative and not in a limiting sense.

The prepolymer mixture is disclosed and claimed in co-pending patent application Serial No. 222,959 filed September 11, 1962 and now Patent No. 3,184,464.

What is claimed is:

1. A process for the production of hollow articles of polymerized lactams, which process comprises producing in a hot mold cavity a liquid polymerizable charge having a temperature at least 40° C. lower than the temperature of the mold, which charge contains (1) a metal lactam catalyst, in which the lactam has the formula:

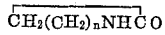

wherein $n$ is an integer from 2 to 12 and the metal is from the group consisting of alkali metals and alkaline earth metals; (2) a symmetrical triazine having a replaceable substituent on at least one of the ring carbon atoms of the triazine; and (3) a lactam having the said formula; maintaining anhydrous conditions in the mold cavity, rotating the mold about a pair of axes angularly disposed with respect to each other at angular velocities at which the resulting centrifugal forces are below the force of gravity, while heating the mold cavity to a temperature within the range of 130° C. to 215° C., to repeatedly wash the walls of the mold cavity with said polymerization charge to build up successive layers of the lactam polymer on the said walls and produce a cast article of polylactam polymer conforming to the shape of the walls of the mold cavity; and removing said article from the mold.

2. The process of claim 1, in which the liquid polymerizable charge consists essentially of epsiloncaprolactam, a symmetrical triazine having replaceable substituents on all three of the ring carbon atoms of the triazine, the replaceable substituents being members of the group consisting of halogen, alkoxy, aryloxy, arylalkoxy, cycloalkoxy, mono- and diarylalkylamino, mono- and di-cycloalkylamino and azo compounds, and having said metal constituent in the proportions of from 0.1 to 10 equivalent weights of metal per 100 equivalents of lactam and from 2 to about 10 equivalent weights of metal per equivalent weight of replaceable substituents in the triazine.

3. The process of claim 1, in which the lactam is epsiloncaprolactam, the symmetrical triazine is a member of the group consisting of 2,4,6-triphenoxy-s-triazine; 2,4,6-trichloro-s-triazine; and 2,4,6-trimethoxy-s-triazine, and the metal lactam is lithium caproylimide.

4. The process of claim 1 wherein the polymerizable charge is produced by introducing into the mold cavity a liquid mixture of lithium caproylimide and epsiloncaprolactam, and a mixture of 2,4,6-triphenoxy-s-triazine and epsiloncaprolactam.

References Cited by the Examiner

UNITED STATES PATENTS

| | | | |
|---|---|---|---|
| 2,624,072 | 1/1953 | Delacoste et al. | 264—310 |
| 2,659,107 | 11/1953 | De Bell | 264—310 |
| 2,967,329 | 1/1961 | Friedland et al. | 264—310 |
| 2,997,745 | 8/1961 | Kroeker | 264—240 |
| 3,017,391 | 1/1962 | Mottus et al. | |
| 3,021,572 | 2/1962 | Smith | 264—310 |
| 3,050,785 | 8/1962 | Cunningham | 264—240 |
| 3,121,768 | 2/1964 | Boyer | 264—337 |
| 3,164,654 | 1/1965 | Spencer | 264—311 |

ROBERT F. WHITE, *Primary Examiner.*

ALEXANDER H. BRODMERKEL, *Examiner.*

J. R. DUNCAN, S. A. HELLER, *Assistant Examiners.*